US006972145B1

(12) United States Patent
Ruid et al.

(10) Patent No.: US 6,972,145 B1
(45) Date of Patent: Dec. 6, 2005

(54) SEMIPERMEABLE COATING FOR BUILDING MATERIALS

(75) Inventors: John O. Ruid, Schwenksville, PA (US); Murray Toas, Norristown, PA (US); Wayne E. Shaw, Glenn Mills, PA (US)

(73) Assignee: CertainTeed Corporation, Valley Forge, PA (US)

( * ) Notice: Subject to any disclaimer, the term of this patent is extended or adjusted under 35 U.S.C. 154(b) by 0 days.

(21) Appl. No.: 10/203,350

(22) PCT Filed: Feb. 1, 2000

(86) PCT No.: PCT/US01/03234

§ 371 (c)(1),
(2), (4) Date: Mar. 3, 2003

(87) PCT Pub. No.: WO01/56779

PCT Pub. Date: Aug. 9, 2001

Related U.S. Application Data

(60) Provisional application No. 60/180,351, filed on Feb. 4, 2000.

(51) Int. Cl.⁷ .................................................. B32B 3/00
(52) U.S. Cl. .................... 428/71; 138/141; 138/145; 138/146; 138/149; 428/74; 428/304.4; 428/308.4; 428/315.9; 428/317.9; 428/320.2; 428/323; 442/76; 442/79; 442/82; 442/85; 442/164; 442/180; 442/221; 442/370; 442/394
(58) Field of Search ................................. 138/141, 145, 138/146, 149; 428/34.1, 34.5, 34.6, 347, 35.7, 35.9, 36.1, 36.2, 36.5, 36.91, 71, 74, 304.4, 308.4, 315.9, 317.9, 320.2, 323; 442/76, 79, 82, 85, 86, 88, 164, 170, 180, 221, 224, 226, 227, 286, 244, 370, 394

(56) References Cited

U.S. PATENT DOCUMENTS

| | | | |
|---|---|---|---|
| 3,092,529 A | 6/1963 | Pearson | |
| 3,212,529 A | 10/1965 | Ullman et al. | |
| 3,394,737 A | 7/1968 | Hoffman et al. | |
| 3,861,425 A | 1/1975 | Clark | |
| 4,101,700 A | 7/1978 | Ray, Jr. et al. | |
| 4,818,595 A * | 4/1989 | Ellis | 442/68 |
| 5,211,988 A * | 5/1993 | Morton | 427/370 |
| 5,314,719 A | 5/1994 | Batdorf et al. | |
| 5,379,806 A | 1/1995 | Matthews et al. | |
| 5,451,256 A * | 9/1995 | Morton | 118/59 |
| 5,487,412 A * | 1/1996 | Matthews et al. | 138/149 |
| 5,556,699 A * | 9/1996 | Niira et al. | 428/323 |
| 5,567,504 A * | 10/1996 | Schakel et al. | 428/167 |
| 5,783,268 A | 7/1998 | Noonan et al. | |
| 5,965,257 A * | 10/1999 | Ahluwalia | 428/357 |
| 6,129,782 A * | 10/2000 | Brodie et al. | 106/15.05 |
| 6,284,313 B1 * | 9/2001 | Matthews et al. | 427/244 |
| 6,399,186 B2 * | 6/2002 | Matthews et al. | 428/306.6 |
| 6,632,753 B1 | 10/2003 | Beasley, Jr. | |
| 2003/0215589 A1 * | 11/2003 | Merical et al. | 428/35.7 |
| 2003/0236043 A1 * | 12/2003 | Calzavara et al. | 442/79 |

* cited by examiner

*Primary Examiner*—Arti R. Singh
(74) *Attorney, Agent, or Firm*—Duane Morris LLP

(57) ABSTRACT

The present invention provides coating materials (14), insulation-containing building material products bearing the materials and methods for applying the coatings to the building material products. The coating materials (14) possess one-way "breathability" characteristics with respect to water and aqueous solutions. That is, the coatings are essentially impermeable to liquid water and permeable to water vapor. Vapor from water insulation coated by the material may thus pass through the coating, whereas liquid water is effectively prevented from passing through the coating and entering the insulation.

29 Claims, 2 Drawing Sheets

SEMIPERMEABLE COATING FOR BUILDING MATERIALS

This application is a 371 of PCT/US01/03234 filed Feb. 1, 2001, which claims the benefit of U.S. Provisional Patent Application No. 60/180,351, filed Feb. 4, 2000.

FIELD OF THE INVENTION

The present invention relates in general to building materials products and, in particular, to coatings for building materials, products bearing such coatings and methods for applying coatings to building materials.

BACKGROUND OF THE INVENTION

Ducts and conduits are used to convey air in building heating, ventilation and air conditioning (HVAC) systems. In many applications, especially in commercial and industrial construction, the ducts are lined with thermal and sound insulating material. The lining or liner enhances the thermal efficiency of the duct work and reduce noise associated with movement of air therethrough. Duct liner may comprise any suitable organic material or inorganic material, e.g., mineral fibers such as fiber glass insulation or the like. Typical fiber glass duct liners, for example, are constructed as fiber glass mats having densities of about 1.5 to 6 pounds per cubic foot (pcf) and thicknesses of about 0.5 to 2 inches. The insulation includes a coating on its inner or "air stream" surface. The air stream surface of the insulation is the surface that conveys air through the duct and is opposite the surface that contacts the duct sheet metal in the final duct assembly. The coating protects the insulation, especially during brush and/or vacuum cleaning of the interior of the duct. If the insulation is unprotected, fibers might become detached from the insulation. Once detached, they may be carried away by the air stream and circulated throughout the building where they may be inhaled by persons in the building. Examples of duct liners having coatings on their inner surfaces are provided in U.S. Pat. Nos. 3,861,425 and 4,101,700. Several coated insulation duct liners are also marketed under the trade designations "TOUGHGARD®". by Certain Teed Corp. of Valley Forge, Pa., "AEROFLEX.®". and "AEROMAT.®". by Owens Corning Fiberglas Corp. of Toledo, Ohio, "PERMACOTE.®"., and "POLYCOUSTIC™" by Johns Manville Corp. of Denver, Colo. and "DUCT LINER E-M™" by Knauf Fiber Glass GmbH of Shelbyville, Ind.

It is well known that microorganisms will grow in an environment where moisture and nutrients are present and that many species of microorganisms have a negative impact on indoor air quality (IAQ). Keeping moisture out of duct liner insulation inhibits growth of potentially harmful microorganisms in the HVAC system.

In the field or fabrication shop, HVAC contractors typically cut and pin duct liner onto sheet metal. This fabrication technique creates small holes and exposed seams in the duct liner where liquid water could seep into the insulation from the exterior of the duct. If liquid water leaks into the insulation through these surface imperfections in a duct liner coated on its air-conveying surface with a continuous layer of impermeable hydrophobic material, the water may collect and stagnate in the insulation and support the growth of microorganisms. Thereafter, the microorganisms may reenter the building's air supply through the same surface imperfections that permitted water to enter the duct work in the first instance.

To address the problem of microorganism growth in HVAC systems, U.S. Pat. Nos. 5,314,719; 5,379,806; 5,487, 412 and 5,783,268 disclose providing antimicrobial agents on or in the air-conveying surfaces of impermeable duct liners and/or duct boards (prefabricated rigid airducts). However, these patents offer no insight into effective ways of preventing water that enters duct work from collecting and stagnating in fibrous mat duct liner insulation material and causing microbe formation therein. Additionally, antimicrobial agents have very limited zones of effectiveness. That is, they tend to prevent microbe formation only in their immediate vicinity. U.S. Pat. No. 5,314,719, for example, describes a zone of antifungal inhibition of about one millimeter. Typical duct liners have insulation thicknesses ranging from about one to two inches. In these products, such a limited zone of inhibition would be essentially useless in preventing microorganism formation caused by duct liner insulation that becomes saturated by water entering through the exterior walls and seams of the duct.

An advantage exists, therefore, for a semipermeable coating suitable for use in coating duct liners or other building material products having a relatively thick layer of insulation material that may be prone to microorganism formation caused by water saturation. The coating should be essentially impermeable to liquid water and permeable to water vapor. In this way, liquid water in the interior of the duct will be repelled from entering the insulation through the coating and water vapor from water contained in the insulation will pass through the coating to promote drying of the insulation, thereby reducing the likelihood of microbial growth in the insulation.

SUMMARY OF THE INVENTION

The present invention provides coating materials, insulation-containing building material products bearing the materials and methods for applying the coatings to the building material products. The coating materials possess one-way "breathability" characteristics with respect to water and aqueous solutions. That is, the coatings are essentially impermeable to liquid water and permeable to water vapor. Vapor from water in insulation coated by the material may thus pass through the coating, whereas liquid water is effectively prevented from passing through the coating and entering the insulation. Thus, the coating not only prevents dry insulation from becoming wetted by liquid water residing on the surface of the coating opposite the insulation but also promotes drying of moist insulation. In the case of HVAC duct liners, for example, at least two significant advantages arise from these properties. The possibility of water stagnation and attendant contamination of the insulation material with microorganisms is reduced. And, being water repellent and having substantial water hold-out properties, the inner air-conveying surface of the duct liner may be cleaned with water or aqueous solutions of water and solvents or detergents without wetting the insulation.

The coating material preferably comprises a foamed acrylic latex polymer that is applied to insulation at relatively low levels during manufacture of a building product. Low levels of coating are important to maintain a semipermeable surface coating layer. Excess coating material may render the coating layer an essentially impermeable film structure. An impermeable coating compromises the acoustical performance of the coated building product because it blocks some sound wave energy from being dissipated in the insulation. Additionally, excess coating adds to manufacturing costs and diminishes if not eliminates the breathability characteristics of the coating.

Other details, objects and advantages of the present invention will become apparent as the following description of the presently preferred embodiments and presently preferred methods of practicing the invention proceeds.

BRIEF DESCRIPTION OF THE DRAWINGS

The invention will become more readily apparent from the following description of preferred embodiments thereof shown, by way of example only, in the accompanying drawings wherein.

DETAILED DESCRIPTION OF THE INVENTION

Figure 1:
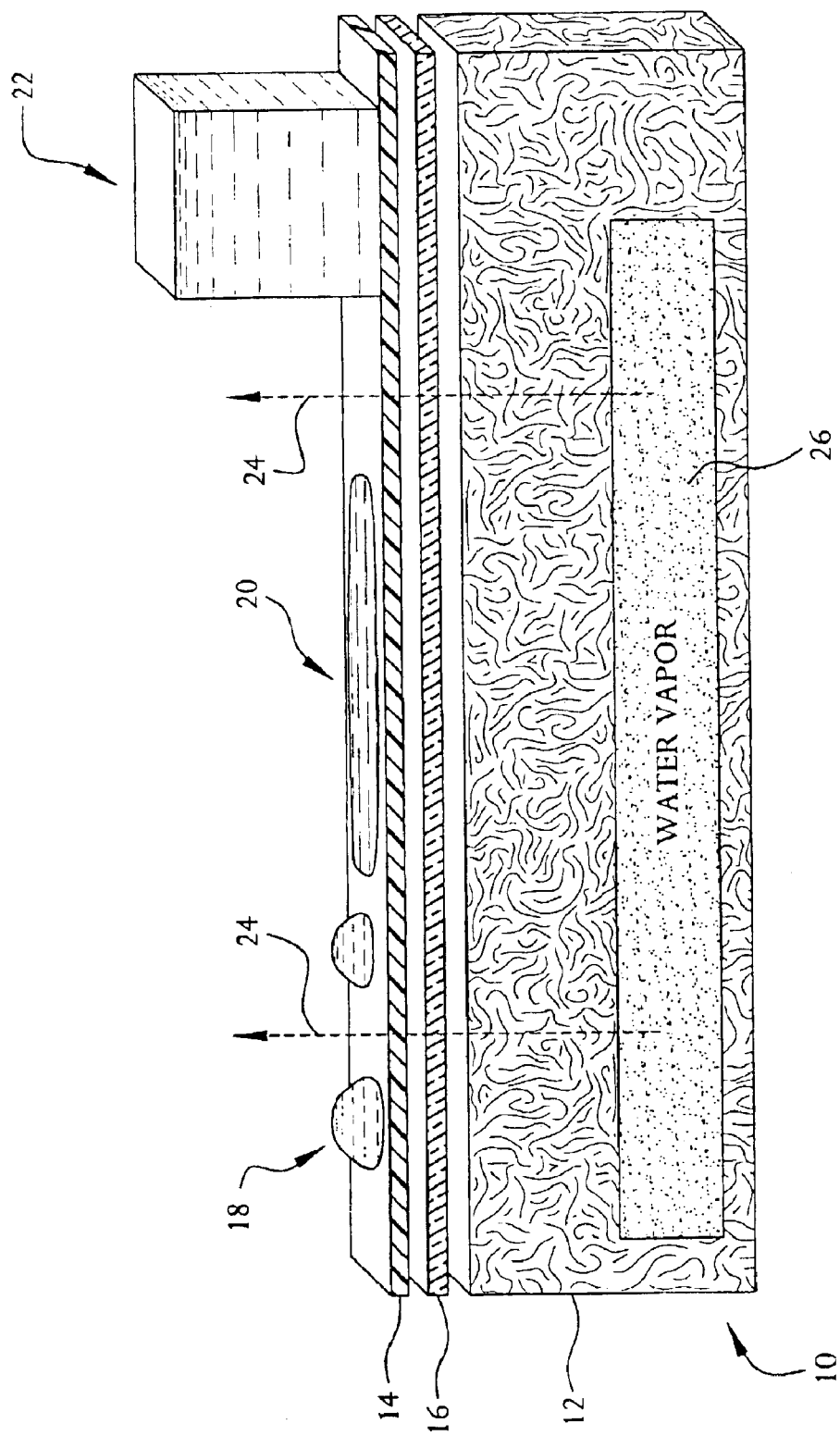
FIG. 1 is an exploded view of an building product constructed according to the present invention that also depicts the semipermeability characteristics of the product with respect to water.

Referring to FIG. 1, there is shown an insulated building product 10 in accordance with the present invention. Building product 10 comprises a base mat 12 of suitable thermal and acoustic insulation material and semipermeable coating 14. Depending its intended application, building product 10 may further include one or more intermediate layers 16 of hydrophobicity enhancing and/or reinforcing material disposed between base mat 12 and coating 14.

Base mat 12 may be chosen from any insulation material appropriate for the building product's intended application. The base mat may be fabricated from nonfibrous material such as polyimide or melamine foam or the like or from mineral fibers such as glass fibers, refractory fibers or mineral wool fibers. The thickness and density of base mat 12 will be dictated by the levels of acoustic and/or thermal insulation that are desired or necessary for a particular building installation. If, for example, building product 10 is constructed to serve as an HVAC duct liner, base mat 12 may have a thickness of about 0.5 to about 2 inches and a density of about 1.5 to about 3 pcf. It will be understood that wall, floor, ceiling or other installations utilizing building product 10 may require a base mat 12 having greater or lesser thicknesses and densities.

When building product 10 is a duct liner, base mat 12 may be made from polyimide or melamine foam or fiber glass. According to a presently preferred duct liner construction, the base mat is shredded and resin-bonded textile (i.e., continuously drawn) fiber glass. In addition, when constructed as a duct liner, building product 10 preferably includes a woven or nonwoven fibrous layer 16 disposed between base mat 12 and coating 14. Suitable layers 16 include Johns Manville Corp. 8440 non-woven glass mat or 1801FX nonwoven glass mat marketed by Lydall Manning of Fort Washington, Pa. The 1801FX mat is desirable because it is chemically sized to enhance hydrophobicity and constructed with a modified fiber geometry to decrease the surface opacity (i.e., amount of openness) of the mats. It is believed that the latter property is achieved by combining different glass fiber diameter blends ranging from 6 to 16 microns. Various length fiber blends ranging from about 0.25 to 1.5 inches in length have also been tested in combination with hydrophobic size chemistries. While the above described non-woven glass mats have not been fully evaluated, they do show promise as an alternative method of achieving a semipermeable insulated building product.

Figure 2:
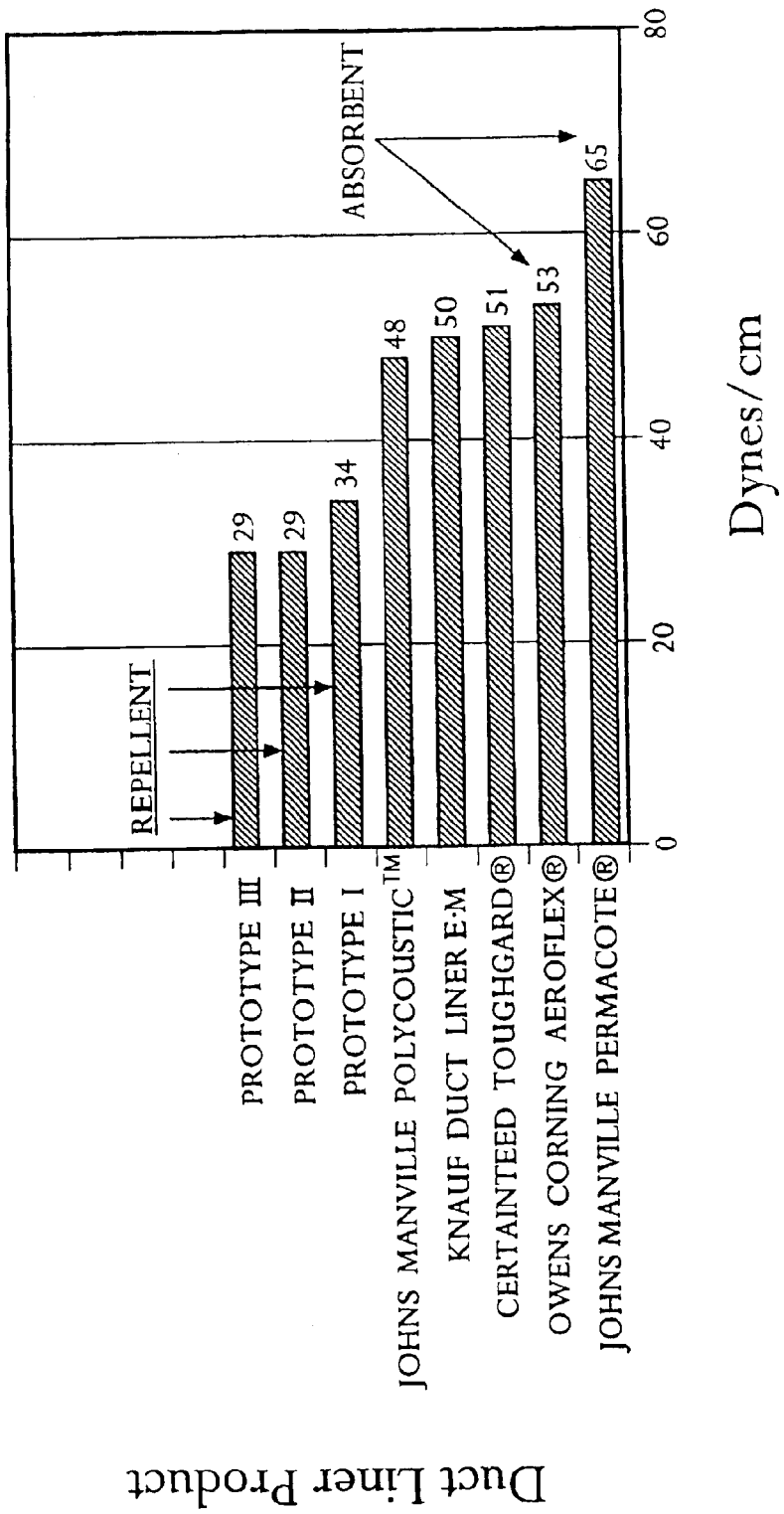
FIG. 2 is a graphical comparison of the water repellency properties of several duct liner prototypes constructed according to the present invention and several commercially available coated duct liner products.

Semipermeable coating 14 is essentially impermeable to liquid water and permeable to water vapor. Vapor from water in base mat 12 coated by coating 14 may thus pass through the coating, whereas liquid water is effectively prevented from passing through the coating and entering the insulation. Thus, the coating not only prevents dry base mat insulation from becoming wetted by liquid water residing on the surface of the coating opposite the insulation but also promotes drying of moist insulation. Semipermeable coating 14 preferably comprises a foamed acrylic latex polymer having fire retardant, antimicrobial or other agents or additives for enhancing the performance of the coating in duct liner or other building product applications. Several duct liner prototypes incorporating the features of the present invention were constructed and evaluated by the present inventors for liquid water repellency, liquid water hold-out and water vapor permeability. The composition of the coatings for these prototypes, identified respectively as Prototype I, Prototype II, Prototype III in FIG. 2, were as follows. The coating for Prototype I was NW 1845 acrylic latex polymer marketed by Rohm & Haas Company of Philadelphia, Pa. under the trade designation ROPLEX®. The coating for Prototype II included about 30 to about 80 weight percent, preferably about 45 to about 55 weight percent, Rohm & Haas Company NW 1845 acrylic latex polymer combined with about 0.12 to about 3.0 weight percent, preferably about 0.2 to about 0.5 weight percent, FC-461 water dispersible fluorocarbon marketed by Minnesota Mining & Manufacturing Co. of Minneapolis, Minn. The coating for Prototype III was Series 3413 acrylic latex polymer, with proprietary hydrophobic additives, marketed by BFGoodrich Company of Charlotte, N.C.

When constructing building product 10 as a duct liner, the desired base mat 12 and intermediate layer 16 are selected and brought together and joined with a phenolic resin in the manner known in the art. Base mat 12 and intermediate layer 16 are transported by a conveyor to an in-line foam coater. Air is injected by the foamer into the liquid acrylic latex polymer compound, thereby creating a frothy mixture having a density of approximately 0.15–0.25 grams per cubic centimeter(cc). Once foamed, the compound is pumped onto the exposed surface of intermediate layer 16 and spread by a doctor blade or knife onto the non-woven glass layer 16 of the moving product. The coated product preferably travels on the conveyor at speeds of approximately 20–80 ft/minute and moves through an oven where the dwell time is approximately 60 seconds to 4 minutes and the oven temperature is maintained between about 350–580° F. Once the product exits the oven, the latex compound is fully cured. Upon curing, the preferred dry coating weights range from between about 3 to about 12 grams per square foot. Best coating performance is achieved by an acrylic latex compound that foams well but has a relatively low level of surfactant. Surfactant, being soap-like, is needed for efficient compound foaming but excess levels of surfactants can degrade surface repellency. With this in mind, compounds such as BFGoodrich Company Series 3413 or Rohm & Haas Company NW 1845 polymers were chosen for their foam enhancing characteristics coupled with a high level of polymer hydrophobicity. In addition, semipermeable coating material formulated from these compounds exhibits excellent water repellency characteristics as demonstrated in FIG. 2.

Referring again to FIG. 1, there is symbolically illustrated the liquid water repellency and water vapor permeability attributes of the building product 10 constructed according to the present invention. The semipermeable surface coatings 14 disclosed herein repel liquid water droplets 18, resist pooled water 20, and hold out a ⅛ to 1 inch (or 200–400 grams of water in a one gallon, open bottom can) liquid water column 22 from penetrating the coating and accumulating in the insulation base mat 12. As indicated by dashed arrows 24, the coating 14 and intermediate layer(s)16, if present, constitute a semipermeable stratum which allows water vapor 26 in the base mat 12 to move through the surface of the coating for release into the atmosphere or into the interior of an HVAC duct if building product 10 is a duct liner.

Not shown on the drawing figures yet demonstrated in the laboratory is the resistance of semipermeable coating 14 to soapy detergent liquids such as those that might be used in cleaning of HVAC duct work. This attribute of the coating was discovered in the laboratory as part of the repellency evaluation tests. Basically, a diluted soapy solution was poured on the surface of the duct liners constructed as described herein and after a period of one hour the soapy solution still remained on the surface and was easily cleaned off the surface with a paper towel.

During research and development associated with the present invention, the present inventors discovered an alternative to the above described processes for producing semipermeable building products, particularly duct liners. More specifically, commercially available "TOUGHGARD®". duct liner product marketed by Certain Teed Corp. as well as several other duct liner products were sprayed with a product called "REVIVEX®", a water repellent fluoropolymer marketed by W. L. Gore & Associates, Inc. of Newark, Del., and cured in an oven for two hours at 250° F. The duct liner products treated with "REVIVEX®" exhibited improved water repellency.

By virtue of the present invention there is provided an acrylic latex surface coating for textile fiber glass duct liner that has the above-described semipermeable properties and hence improves building IAQ. The duct liners also have solvent and liquid detergent resistance to enable wet cleaning of the duct.

The present invention also offers a cost-effective, breathable (semipermeable) coating that may be useful in connection with any type of building product, whether insulated or not. The coating allows water vapor to pass through unimpeded, whereby water vapor freely moves into and out of the insulation. By way of example, but not limitation, the coating can be applied to other HVAC products such as duct board and the like or other organic or inorganic substrates used in the building material industry where the technology described herein has merit.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A building product comprising:
   a base mat having a thickness from about 0.5 inch to about 2 inches and a density of about 1.5 pounds per cubic foot to about 3 pounds per cubic foot; and
   a coating carried by said base mat, said coating being present at a level whereby said coating is essentially impermeable to liquid water and permeable to water vapor, said coating having a weight between about 3 and about 12 grams per square foot, said coating comprising a foaming agent.

2. The building product of claim 1 wherein said base mat is fabricated from nonfibrous foam.

3. The building product of claim 1 wherein said base mat is fabricated from mineral fibers.

4. The building product of claim 3 wherein said mineral fibers are selected from the group consisting of glass fibers, refractory fibers and mineral wool fibers.

5. The building product of claim 4 wherein said base mat is shredded and resin-bonded continuously drawn fiber glass.

6. The building product of claim 1 wherein said coating comprises a polymer.

7. The building product of claim 6 wherein said coating further comprises at least one performance enhancing agent.

8. The building product of claim 7 wherein said at least one performance enhancing agent is a fire retardant agent.

9. The building product of claim 7 wherein said at least one performance enhancing agent is an antimicrobial agent.

10. The building product of claim 6 wherein said polymer is a foamed acrylic latex polymer.

11. The building product of claim 6 wherein said polymer is a fluoropolymer.

12. The building product of claim 1 further comprising a fibrous layer disposed between said base mat and said coating.

13. The building product of claim 12 wherein said fibrous layer is joined to said base mat by a resin.

14. The building product of claim 13 wherein said resin is phenolic resin.

15. The building product of claim 12 wherein said fibrous layer is woven.

16. The building product of claim 12 wherein said fibrous layer is nonwoven.

17. The building product of claim 16 wherein said nonwoven fibrous layer is glass fiber mat.

18. The building product of claim 1 wherein said building product is a duct liner.

19. The building product of claim 1 wherein said building product is a duct board.

20. The product of claim 1, wherein the coating comprises about 30 weight percent to about 80 weight percent acrylic latex polymer.

21. The product of claim 20, wherein the coating further comprises about 0.12 weight percent to about 3.0 weight percent water dispersible fluorocarbon.

22. The product of claim 20, wherein the coating comprises about 45 weight percent to about 55 weight percent acrylic latex polymer.

23. The product of claim 22, wherein the coating further comprises about 0.2 weight percent to about 0.5 weight percent water dispersible fluorocarbon.

24. The product of claim 16, wherein the nonwoven fibrous mat is sized to enhance hydrophobicity.

25. The product of claim 16, wherein the nonwoven fibrous mat comprises a plurality of different glass fiber diameters.

26. The product of claim 25, wherein the plurality of different glass fiber diameters range from 6 to 16 microns.

27. The product of claim 1, wherein:
   said base mat is fabricated from mineral fibers from the group consisting of glass fibers, refractory fibers and mineral wool fibers;
   said polymer is an acrylic latex polymer or a fluropolymer; and
   said product further comprises a nonwoven glass fiber mat disposed between said base mat and said coating, said fibrous layer joined to said base mat by a resin.

28. The product of claim 1, wherein the coating comprises about 55 weight percent acrylic latex polymer.

29. The product of claim 1, wherein the coating comprises about 80 weight percent acrylic latex polymer.

* * * * *